United States Patent
Hwang et al.

(10) Patent No.: US 9,420,604 B2
(45) Date of Patent: Aug. 16, 2016

(54) APPARATUS AND METHOD FOR DOWNLINK SCHEDULING IN A MULTI ANTENNA WIRELESS COMMUNICATION SYSTEM

(75) Inventors: In-Soo Hwang, Yongin-si (KR);
Yung-Soo Kim, Seongnam-si (KR);
Young-Ho Jung, Suwon-si (KR);
Sang-Woon Jeon, Daejeon (KR);
Sae-Young Chung, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1254 days.

(21) Appl. No.: 12/075,960

(22) Filed: Mar. 14, 2008

(65) Prior Publication Data

US 2008/0233968 A1     Sep. 25, 2008

(30) Foreign Application Priority Data

Mar. 14, 2007   (KR) .................. 10-2007-0025254

(51) Int. Cl.
| | | |
|---|---|---|
| H04L 1/00 | (2006.01) | |
| H04W 72/12 | (2009.01) | |
| H04B 7/04 | (2006.01) | |
| H04B 7/06 | (2006.01) | |
| H04B 17/24 | (2015.01) | |
| H04L 1/06 | (2006.01) | |

(52) U.S. Cl.
CPC ......... *H04W 72/1284* (2013.01); *H04B 7/0417* (2013.01); *H04B 7/0452* (2013.01); *H04B 7/0626* (2013.01); *H04B 7/0647* (2013.01); *H04B 17/24* (2015.01); *H04L 1/0027* (2013.01); *H04L 1/0026* (2013.01); *H04L 1/0618* (2013.01); *H04L 2001/0093* (2013.01); *H04W 72/1231* (2013.01)

(58) Field of Classification Search
CPC .......................... H04L 5/007; H04L 27/2647
USPC ................................. 455/69, 455.2
See application file for complete search history.

(56) References Cited

U.S. PATENT DOCUMENTS

| | | | | |
|---|---|---|---|---|
| 5,828,962 | A * | 10/1998 | Ho-A-Chuck | 455/446 |
| 7,003,290 | B1 * | 2/2006 | Salonaho et al. | 455/423 |
| 2003/0060236 | A1 * | 3/2003 | Kim et al. | 455/562 |
| 2003/0125040 | A1 | 7/2003 | Walton et al. | |
| 2004/0121766 | A1 * | 6/2004 | Benson et al. | 455/425 |
| 2006/0009189 | A1 * | 1/2006 | Kim et al. | 455/403 |

FOREIGN PATENT DOCUMENTS

| | | | |
|---|---|---|---|
| KR | 1020040074340 A | 8/2004 | |
| KR | 1020060119144 A | 11/2006 | |
| WO | WO 2006/048037 A1 * | 5/2006 | .......... H04L 27/26 |

OTHER PUBLICATIONS

Office Action dated Oct. 30, 2009 in connection with Korean Patent Application No. 10-2007-0025254.

* cited by examiner

*Primary Examiner* — Joshua Schwartz

(57) ABSTRACT

An apparatus and method for downlink scheduling in a multi antenna wireless communication system are provided. The apparatus includes a receiver for receiving channel information of at least one mobile station that is selected as an active user by a base station, a judgment unit for judging whether it feeds back its own channel information using the channel information of the selected at least one mobile station, and a transmitter for transmitting the its own channel information to the base station according to judgment of the judgment unit.

38 Claims, 10 Drawing Sheets

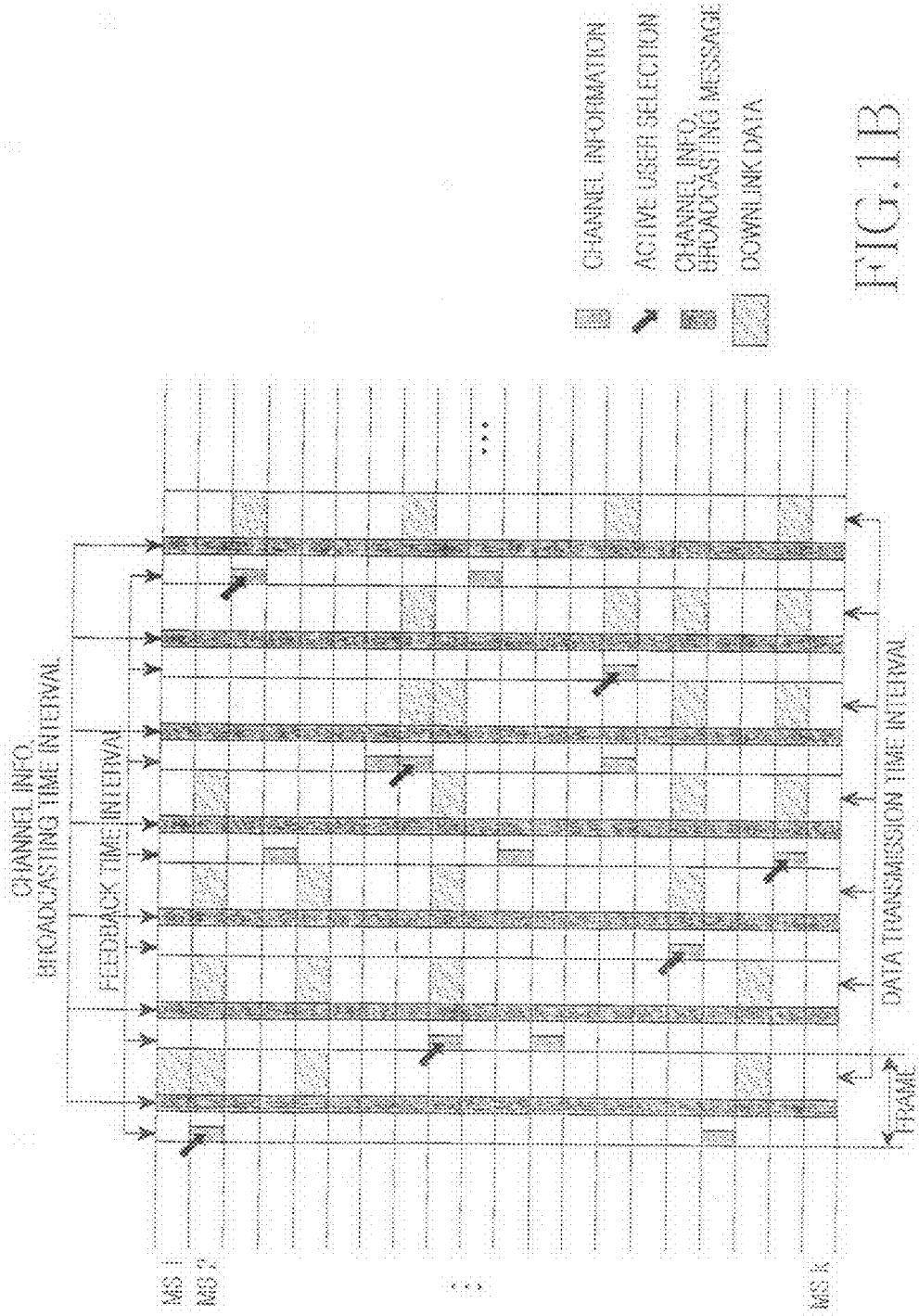

APPARATUS AND METHOD FOR DOWNLINK SCHEDULING IN A MULTI ANTENNA WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Mar. 14, 2007 and assigned Serial No. 2007-25254, the entire disclosure of which is hereby incorporated by reference.

TECHNICAL FIELD OF THE INVENTION

The present invention relates to a multi antenna wireless communication system. More particularly, the present invention relates to an apparatus and method for downlink scheduling in a multi antenna wireless communication system.

BACKGROUND OF THE INVENTION

For the purpose of more efficient use of limited radio resources, multi antenna wireless communication systems are attracting attention and are now in progress of active research. Multi antenna wireless communication systems can acquire a gain of signal transmission and reception performance through beamforming using a plurality of antennas. Also, multi antenna wireless communication systems can acquire a spatial multiplexing and space diversity gain using a Multiple Input Multiple Output (MIMO) technology.

Scheduling techniques of multi antenna wireless communication systems are divided into two as follows:

First is a scheduling scheme using Channel State Information (CSI) wherein the CSI fed back, that is, an accurate channel state value is collected from a receiving stage and an optimal receiving-stage combination or an optimal stream combination is determined.

Second is a scheduling scheme using Channel Quality Information (CQI) wherein the CQI, that is, approximate channel information is collected from a receiving stage and scheduling is performed.

The scheduling scheme using CSI can employ Dirty Paper Coding (DPC) and beamforming ensuring a high reception success rate in a physical layer, however, has a disadvantage of generating many overheads because of a number of data amount of CSI. For example, a transmission stage bears a burden of having to feed back a channel matrix of a size of Nt×Nr in cases where the transmission stage uses Nt number of transmit antennas and a reception stage uses Nr number of receive antennas. The scheduling scheme using CQI can employ Space Time Coding (STC) and opportunistic beamforming. The STC and opportunistic beamforming cannot ensure as much high reception success rate as the DPC and beamforming, however, have an advantage that a relatively small size of feedback information is required.

Scheduling complexity can be judged from calculation complexity and required feedback information amount. In the multi antenna wireless communication system, the scheduling complexity is generally increased proportional to number of transmit/receive antennas. Therefore, there is needed an alternative for reducing the scheduling complexity.

SUMMARY OF THE INVENTION

To address the above-discussed deficiencies of the prior art, it is a primary aspect of the present invention to address at least the above-mentioned problems and/or disadvantages and to provide at least the advantages described below. Accordingly, an aspect of the present invention is to provide an apparatus and method for reducing scheduling complexity in a multi antenna wireless communication system.

Another aspect of the present invention is to provide an apparatus and method for reducing an amount of channel information fed back from a mobile station (MS) in a multi antenna wireless communication system.

A further aspect of the present invention is to provide an apparatus and method for feeding back and receiving channel information from any mobile station and performing scheduling in a multi antenna wireless communication system.

The above aspects are addressed by providing an apparatus and method for downlink scheduling in a multi antenna wireless communication system.

According to one aspect of the present invention, a mobile station (MS) apparatus of a multi antenna wireless communication system is provided. The apparatus includes a receiver for receiving channel information of at least one mobile station that is selected as an active user by a base station (BS), a judgment unit for judging whether it feeds back its own channel information using the channel information of the selected at least one mobile station, and a transmitter for transmitting the its own channel information to the base station according to judgment of the judgment unit.

According to another aspect of the present invention, a base station (BS) apparatus of a multi antenna wireless communication system is provided. The apparatus includes a receiver for receiving channel information from at least one mobile station (MS), a scheduler for selecting at least one mobile station among one or more mobile stations having fed back the channel information and including the selected at least one mobile station among an active user set, and a transmitter for broadcasting channel information of the selected at least one mobile station.

According to a further aspect of the present invention, a channel information feedback method of a mobile station (MS) in a multi antenna wireless communication system. The method includes receiving channel information of at least one mobile station that is selected as an active user by a base station (BS); judging whether it feeds back its own channel information using the channel information of the selected at least one mobile station; and transmitting the its own channel information to the base station according to the judgment result.

According to still another aspect of the present invention, a scheduling method of a base station (BS) in a multi antenna wireless communication system. The method includes receiving channel information from at least one mobile station (MS); selecting at least one mobile station among one or more mobile stations having fed back the channel information and including the selected at least one mobile station among an active user set; and broadcasting channel information of the selected at least one MS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1B is a diagram illustrating a second example of frame use in a multi antenna wireless communication system according to an exemplary embodiment of the present invention;

DETAILED DESCRIPTION OF THE INVENTION

Figure 1A:
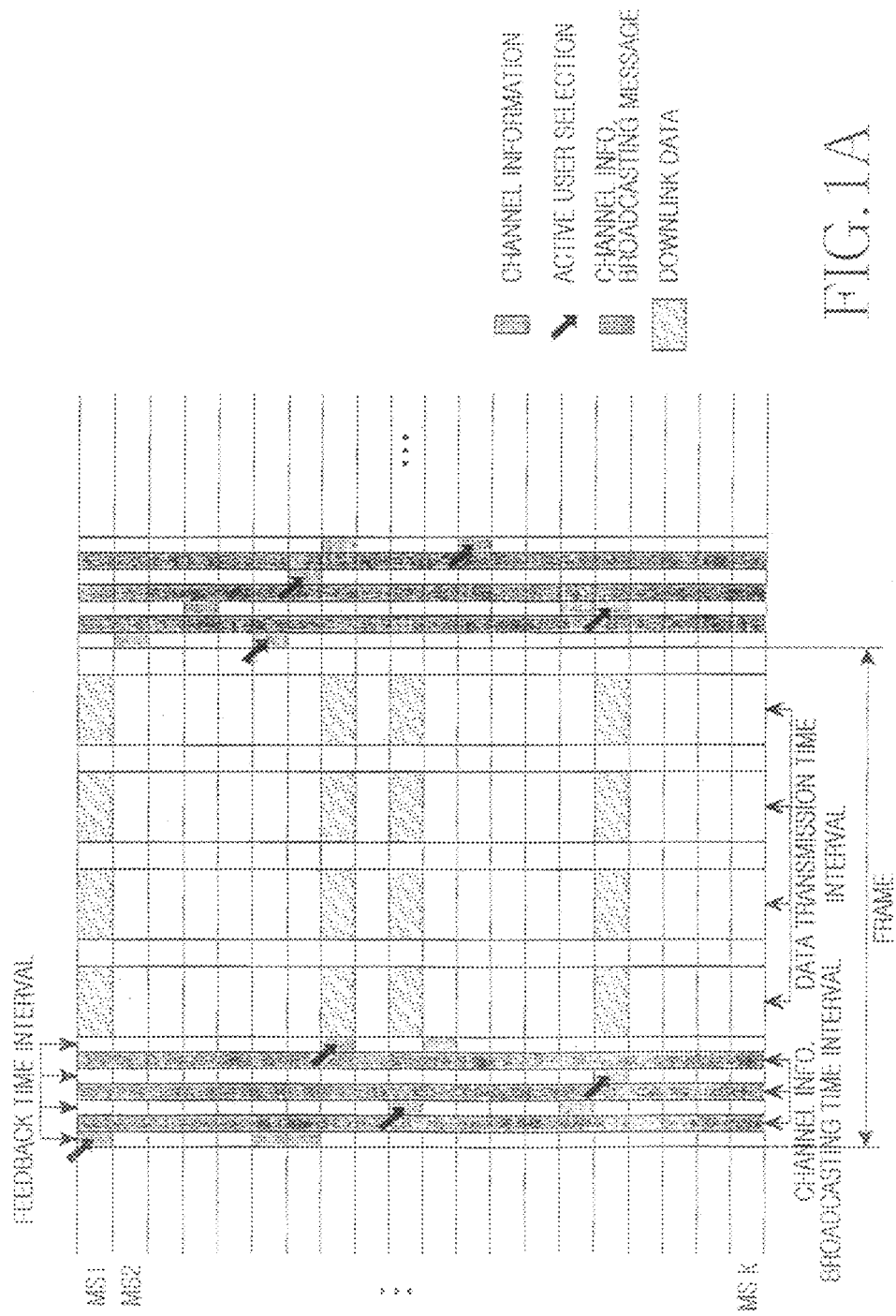
FIG. 1A is a diagram illustrating a first example of frame use in a multi antenna wireless communication system according to an exemplary embodiment of the present invention.

FIGS. 1A through 8C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A technique for reducing an amount of channel information fed back from a mobile station (MS) and increasing a data reception success rate in a multi antenna wireless communication system according to the present invention is described below. The following description is based on the assumption that Spatial Division Multiple Access (SDMA) communication is performed between a base station (BS) using a plurality of transmit antennas and a plurality of mobile stations using one receive antenna.

First, what a technology proposed in the present invention would solve is briefly described.

The present invention is based on the assumption that a base station has Nt number of transmit antennas and 'K' number of mobile stations has one receive antenna. A channel between a mobile station (MS) (k) and a base station (BS) at transmission time (t) is a time-varying channel and is denoted by $h_k(t)$. The $h_k(t)$ is a matrix of a $(1 \times N_t)$ size. A set of mobile stations performing downlink communication during a transmission time (t) is defined as 'active user set'. The active user set can be expressed as in Equation 1 below:

$$S(t)=\{s(1),s(2),\ldots,s(M)\} \quad (1),$$

where $S(t)$ is the active user set, $s(m)$ is m-th MS performing downlink communication during time (t), and M is the number of elements of active user set.

An effective channel for the active user set is expressed as in Equation 2 below:

$$H(S(t))=[h_{s(1)}{}^T, h_{s(2)}{}^T, \ldots, h_{s(M)}{}^T]^T \quad (2),$$

where $H(S(t))$ is the effective channel matrix for active user set, $h_{s(m)}{}^T$ is a transpose matrix of channel matrix between MS (m) and BS, and M is the number of elements of active user set.

In general, since the number of the total mobile stations K is larger than number of transmit antennas of a BS $N_t$, multiplexing gain is limited by the number of the transmit antennas of the BS $N_t$. Thus, the number of the elements of the active user set M is smaller or equal to the number of the transmit antennas of the BS $N_t$. A set of received signals of mobile stations included the active user set can be expressed as in Equation 3 below:

$$y(t)=H(S(t))x(t)+n(t) \quad (3),$$

where $y(t)$ is a set of signal received by mobile stations at time t, $H(S(t))$ is the effective channel matrix for active user mobile stations at time t, $x(t)$ is the transmitted signal at time t, and $n(t)$ is the noise at time t.

If the BS forms a transmission beam, a transmitted signal of the BS can be expressed as in Equation 4 below:

$$x(t)=W(S(t))u(t) \quad (4),$$

where $x(t)$ is the transmitted signal at time t, $W(S(t))$ is the transmission beam matrix at time t, and $u(t)$ is the transmitted symbols at time t.

If the BS performs Zero Forcing (ZF) beamforming, the beam matrix is expressed as in Equation 5 below:

$$W(S(t))_{ZF}=H(S(t))^H\{H(S(t))H(S(t))^T\}^{-1} \quad (5),$$

where $W(S(t))_{ZF}$ is the beam matrix for ZF beamforming, and $H(S(t))$ is the effective channel matrix for active user mobile stations.

If the BS performs the ZF beamforming, the maximum transfer rate is calculated as in Equation 6 below:

$$R_{ZF}(t) = \max_{S(t)} \sum_{k \in S(t)} \log\left(1 + \frac{\gamma_{k,ZF} P}{M}\right), \quad (6)$$

where $S(t)$ is the active user set, M is the number of elements of active user set, P is the transmitted power, and $\beta_{k,ZF}$ is the effective signal to noise ratio.

The effective signal to noise ratio is expressed as in Equation 7 below:

$$\gamma_{k,ZF}=[H(S(t))H(S(t))^H]_{k,k}{}^{-1} \quad (7),$$

where $\gamma_{k,ZF}$ is the effective signal to noise ratio, S(t) is the active user set, H(S(t)) is the channel matrix for active user mobile stations, and $[X]_{k,k}$ is the k-th diagonal element of any matrix X.

If the BS performs Zero Forcing-Dirty Paper Coding (ZF-DPC) beamforming, the beam matrix is expressed as in Equation 8 below:

$$W(S(t))=Q^H \qquad (8),$$

where W(S(t)) is the beam matrix, and Q is the Orthogonal matrix obtained by QR-decomposing effective channel matrix H(S(t)).

If the BS performs the ZF-DPC beamforming, the maximum transfer rate is expressed as in Equation 9 below:

$$R_{ZF-DPC}(t) = \max_{S(t)} \sum_{k \in S(t)} \log\left(1 + \frac{\gamma_{k,ZF-DPC} P}{M}\right), \qquad (9)$$

where S(t) is the active user set, M is the number of elements of active user set, P is the transmitted power, and $\gamma_{k,ZF-DPC}$ is the effective signal to noise ratio.

The effective signal to noise ratio is a diagonal element of Q that is expressed in Equation 8.

From Equations 6 and 9, it can be understood that the maximum transfer rate has a close relationship with the active user set. Thus, the present invention proposes a technology for seeking for an active user set maximizing the maximum transfer rate with low complexity.

A channel information acquisition scheme and a data transmission scheme of a base station according to the present invention are described below.

FIGS. 1A and 1B illustrate examples of frame use in a multi antenna wireless communication system according to an exemplary embodiment of the present invention. The example of FIG. 1A shows a scheme for determining all mobile stations to use each stream during a predetermined time interval and then performing communication. The predetermined time interval is defined as a "handshaking phase time interval" in the present invention. The example of FIG. 1B shows a scheme for selecting a mobile station (MS) to use each stream depending on an independent period by each stream.

In FIG. 1A, one frame includes a plurality of feedback time intervals, a plurality of channel information broadcasting time intervals, and a plurality of data transmission time intervals. The sum of the plurality of feedback time intervals and the plurality of channel information broadcasting time intervals is equal to the handshaking phase time interval. That is, if channel information is fed back from a plurality of mobile stations during each feedback time interval, a BS selects predetermined number of mobile stations in compliance with a constant rule and includes the selected mobile stations among an active user set. FIG. 1A shows an example where only one MS is selected. The BS broadcasts channel information of the selected MS to all mobile stations. Broadcasting the channel information of the selected MS is for determining whether each non-selected mobile station would feed back channel information or not. In other words, if a predetermined condition is satisfied as the determination result referring to the broadcasted channel information, each MS feeds back its own channel information during a follow-up feedback time interval. As shown in FIG. 1A, the BS performs channel information reception during four feedback time intervals and channel information broadcasting during three channel information broadcasting time intervals, then determines mobile stations to be included among the active user set, and then performs downlink communication with the mobile stations included among the active user set during data transmission time intervals among remaining frame time intervals.

In FIG. 1B, one frame includes one feedback time interval, one channel information broadcasting time interval, and one data transmission time interval. That is, in FIG. 1B, mobile stations included among an active user set are varied every data transmission time interval. Compared to FIG. 1A, in FIG. 1B, a separate handshaking phase time interval is not present, a new active user MS is selected before every data transmission time interval, and an MS earliest included among an active user set is excluded. If no MS feeds back channel information during a feedback time interval, the BS performs erroneous operation. Thus, it is controlled for some of mobile stations within a cell to feedback channel information irrespective of a feedback condition.

Construction and operation of an MS and a BS, for performing scheduling in compliance with the above-mentioned scheme according to the present invention are described in detail with reference to the accompanying drawings.

Figure 2:
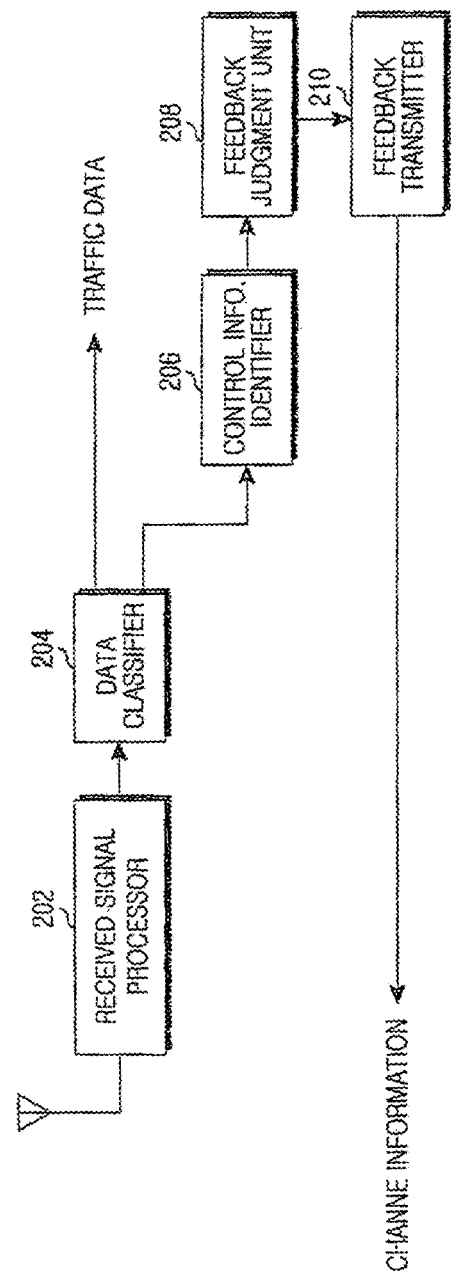
FIG. 2 is a block diagram illustrating a construction of a Mobile Station (MS) in a multi antenna wireless communication system according to an exemplary embodiment of the present invention.

FIG. 2 is a block diagram illustrating a construction of an MS in a multi antenna wireless communication system according to an exemplary embodiment of the present invention.

Referring to FIG. 2, the MS includes a received signal processor 202, a data classifier 204, a control information identifier 206, a feedback judgment unit 208 and a feedback transmitter 210.

The received signal processor 202 converts a signal received from a BS into an information bit stream in compliance with a corresponding communication scheme. For example, in case of the communication scheme is Orthogonal Frequency Division Multiplexing (OFDM), the received signal processor 202 converting a signal received through an antenna into an information bit stream by performing Inverse Fast Fourier Transform (IFFT) operation, demodulation, decoding.

The data classifier 204 classifies the information bit stream provided from the received signal processor 202 into traffic data and control information. The traffic data is processed according to a corresponding process and the control information is outputted to the control information identifier 206.

The control information identifier 206 identifies the control information provided from the data classifier 204. Particularly, the control information identifier 206 identifies channel information, which is broadcasted by the BS, of an MS selected as an active user and provides the identified channel information to the feedback judgment unit 208 according to the present invention.

The feedback judgment unit 208 receives the channel information of the selected MS from the control information identifier 206 and decides whether it feeds back the channel information during a feedback time interval. In detail, the feedback judgment unit 208 calculates its own effective channel value using the channel information of the selected MS. The effective channel value is calculated as in Equation 10 below:

$$\eta_k = h_k \cdot P_\perp(H(S)) \qquad (10),$$

where $\eta_k$ is the effective channel value of MS (k), $h_k$ is the channel matrix of MS k, $P_\perp(\cdot)$ is the function calculating projection matrix, and H(S) is the channel matrix of selected MS.

$P_\perp(\cdot)$ denotes a function performing operation of Equation 11 below:

$$P_\perp(H) = I_{Nt} - H^H(HH^H)^{-1}H \qquad (11),$$

where $P_\perp(H)$ is the projection matrix that is orthogonal with matrix (H), $I_{Nt}$ is the unit matrix of $N_t$ size, and H is the channel matrix with BS.

The feedback judgment unit 208 controls the feedback transmitter 210 to feedback channel information if an absolute value of an effective channel value calculated in Equation 10 above is larger than a threshold value. However, in another exemplary embodiment of the present invention for the channel information feedback, if there is a reservation for an MS to feedback channel information, the feedback judgment unit 208 controls the feedback transmitter 210 to feedback the channel information regardless of the effective channel value.

The feedback transmitter 210 transmits MS's own channel information to a BS during a feedback time interval within a frame depending on judgment of the feedback judgment unit 208.

Figure 3:
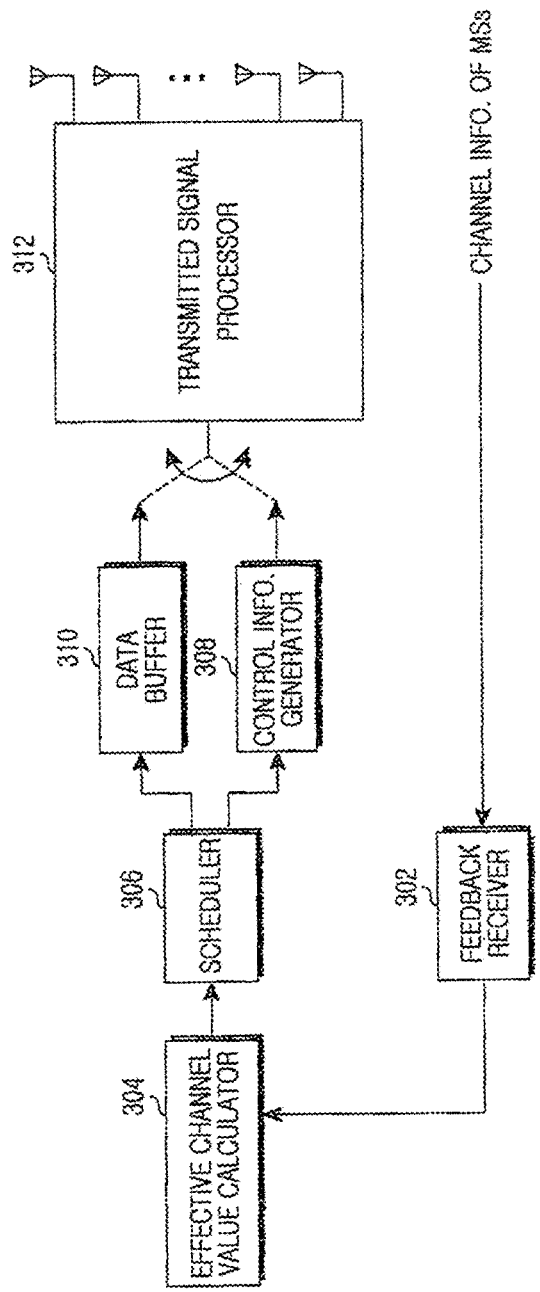
FIG. 3 is a block diagram illustrating a construction of a Base Station (BS) in a multi antenna wireless communication system according to an exemplary embodiment of the present invention.

FIG. 3 is a block diagram illustrating a construction of a BS in a multi antenna wireless communication system according to an exemplary embodiment of the present invention.

As shown in FIG. 3, the BS includes a feedback receiver 302, an effective channel value calculator 304, a scheduler 306, a control information generator 308, a data buffer 310 and a transmitted signal processor 312.

The feedback receiver 302 receives control information fed back from mobile stations. Particularly, the feedback receiver 302 receives channel information of mobile stations during a feedback time interval within a frame and provides the received channel information to the effective channel value calculator 304 according to the present invention.

The effective channel value calculator 304 receives channel information of each MS from the feedback receiver 302 and calculates an effective channel value of each MS. The effective channel value is calculated as in Equation 10 above.

The scheduler 306 performs scheduling for performing downlink communication. Particularly, the scheduler 306 determines an MS to be included among an active user set, using an effective channel value of each MS received from the effective channel value calculator 304 according to the present invention. The MS to be included among the active user set is equal to at least one, which is selected in descending order of effective channel value, of mobile stations having fed back channel information. Number of selected mobile stations is different depending on a concrete exemplary embodiment. If there is no MS having fed back channel information, the scheduler 306 again selects mobile stations that have been selected at the time a previous active user set determination is made. If not being able to again select the mobile stations that have been selected at the time the previous active user set determination is made, the scheduler 306 selects and includes any MS among the active user set. The active user set can be either updated by the same period for all streams through handshaking phase as shown in FIG. 1A or can be updated by an independent period by each stream as shown in FIG. 1B.

The control information generator 308 generates control information for performing communication with an MS. Specifically, the control information generator 308 generates a broadcasting message including channel information of mobile stations selected by the scheduler 306 and provides the broadcasting message to the transmitted signal processor 312 during a channel information broadcasting time interval within a frame according to the present invention. Also, the control information generator 308 generates a control message for controlling some mobile stations to compulsorily feedback channel information and outputs the control message to the transmitted signal processor 312.

The data buffer 310 stores data to be transmitted to mobile stations and outputs data of mobile stations included among the active user set to the transmitted signal processor 312 during a data transmission time interval within a frame. The transmitted signal processor 312 converts an information bit stream provided from the control information generator 308 and the data buffer 310 into a signal of a corresponding communication scheme and transmits the signal through an antenna. For example, when the communication scheme is OFDM, the transmitted signal processor 312 converts the information bit stream into an OFDM symbol by performing encoding, modulation, Fast Fourier Transform (FFT) operation and transmits the OFDM symbol through an antenna.

Figure 4:
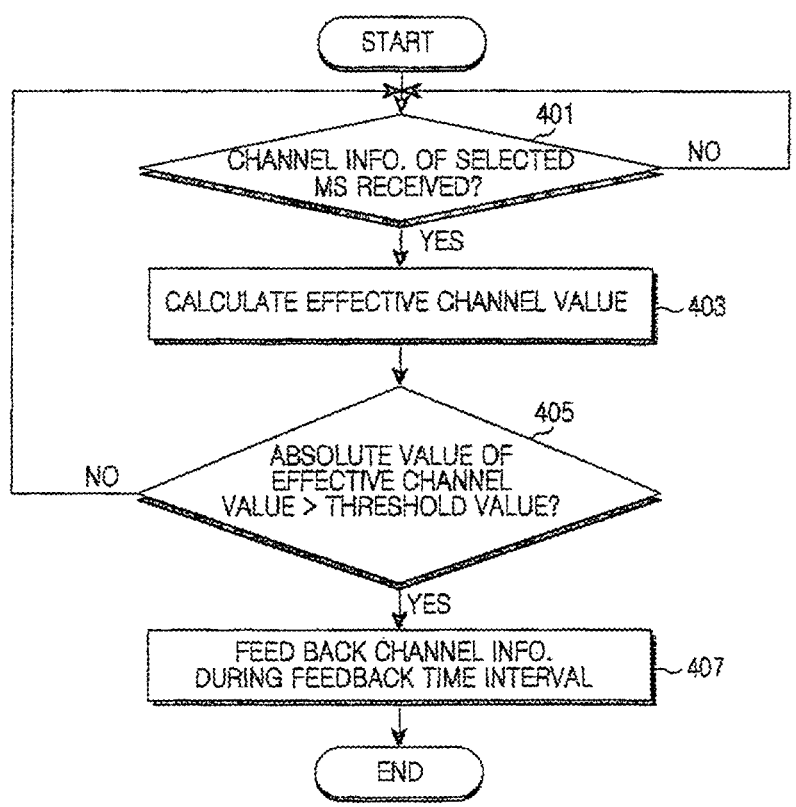
FIG. 4 is a flow diagram illustrating a channel information feedback process of an MS in a multi antenna wireless communication system according to a first exemplary embodiment of the present invention.

FIG. 4 is a flow diagram illustrating a channel information feedback process of an MS in a multi antenna wireless communication system according to a first exemplary embodiment of the present invention.

Referring to FIG. 4, the MS identifies whether it receives channel information, which is broadcasted by a BS, of a selected MS in step 401.

If the channel information of the selected MS is received, the MS calculates an effective channel value using the channel information of the selected MS in step 403. The effective channel value is calculated as in Equation 10 above.

After the effective channel value is calculated, the MS compares an absolute value of the effective channel value with a predetermined threshold value in step 405. If the absolute value of the effective channel value is smaller or equal to the predetermined threshold value, the MS does not feed back channel information during a follow-up feedback time interval and returns to the step 401, identifying whether it receives channel information of a newly selected MS during a subsequent channel information broadcasting time interval.

If the absolute value of the effective channel value is otherwise larger than the predetermined threshold value, the MS transmits the channel information to a BS during a feedback time interval within a frame in step 407.

Figure 5:
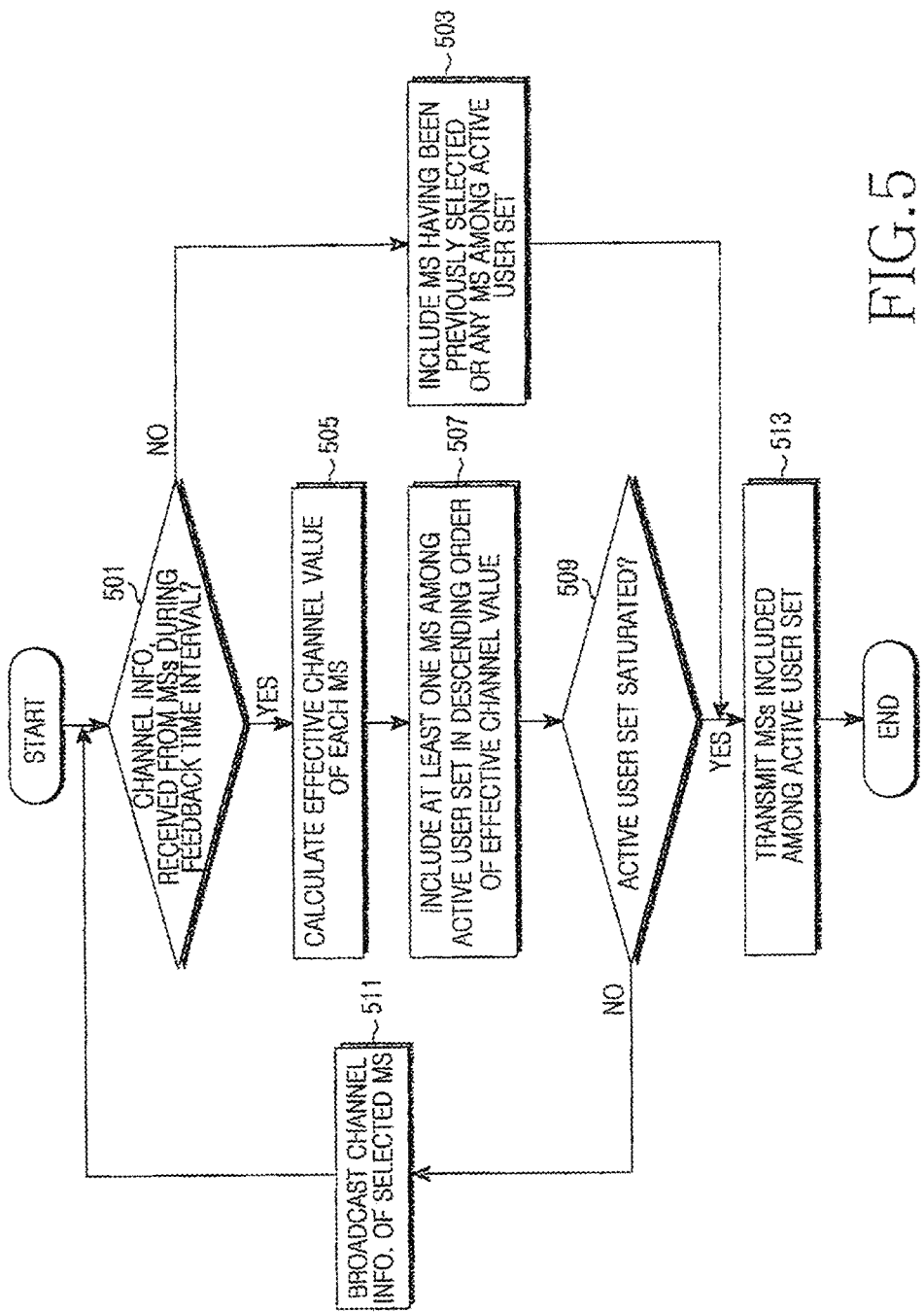
FIG. 5 is a flow diagram illustrating a downlink data transmission process of a BS in a multi antenna wireless communication system according to a first exemplary embodiment of the present invention.

FIG. 5 is a flow diagram illustrating a downlink data transmission process of a BS in a multi antenna wireless communication system according to a first exemplary embodiment of the present invention. FIG. 5 shows an operation process, during one frame time interval, of a BS performing scheduling in compliance with the scheme of FIG. 1A.

Referring to FIG. 5, the BS identifies whether it receives channel information from mobile stations during a feedback time interval within a frame in step 501. At this time, the BS is in a state where an active user set is initialized as a null set at a frame start time point.

If channel information is not received from mobile stations during the feedback time interval, the BS re-selects and includes a previously selected MS among an active user set in step 503. If not being able to re-select the previously selected MS, the BS selects and includes any MS among the active user set.

If channel information is otherwise received from mobile stations during the feedback time interval, the BS calculates an effective channel value of each MS having fed back the channel information in step 505. The effective channel value is calculated as in Equation 10 above.

After the effective channel value of each MS is calculated, the BS includes at least one MS among the active user set in descending order of effective channel value in step 507. In other words, the BS identifies at least one MS having a large effective channel value and includes the identified at least one MS among the active user set. The number of the selected mobile stations is different depending on a concrete exemplary embodiment. However, the maximum value of the number of the selected mobile stations is obtained by dividing the maximum number of mobile stations, which can be included among the active user set, by number of feedback time intervals included in one frame.

After the selected at least one MS is included among the active user set, the BS identifies whether the active user set is saturated in step 509. In other words, the BS identifies whether feedback time intervals within a frame all expire. The maximum number of mobile stations that can be included among the active user set is equal to number of mobile stations with which the BS can communicate at the same time.

If the active user set is not saturated otherwise, the BS broadcasts channel information of the selected MS in step 511. That is, in order for mobile stations to judge whether it transmits channel information during a follow-up feedback time interval, the BS broadcasts the channel information of the selected MS. Then, the BS returns to the step 501.

If the active user set is otherwise saturated, the BS transmits data to mobile stations included among the active user set during a data transmission time interval within a frame in step 513.

Figure 6:
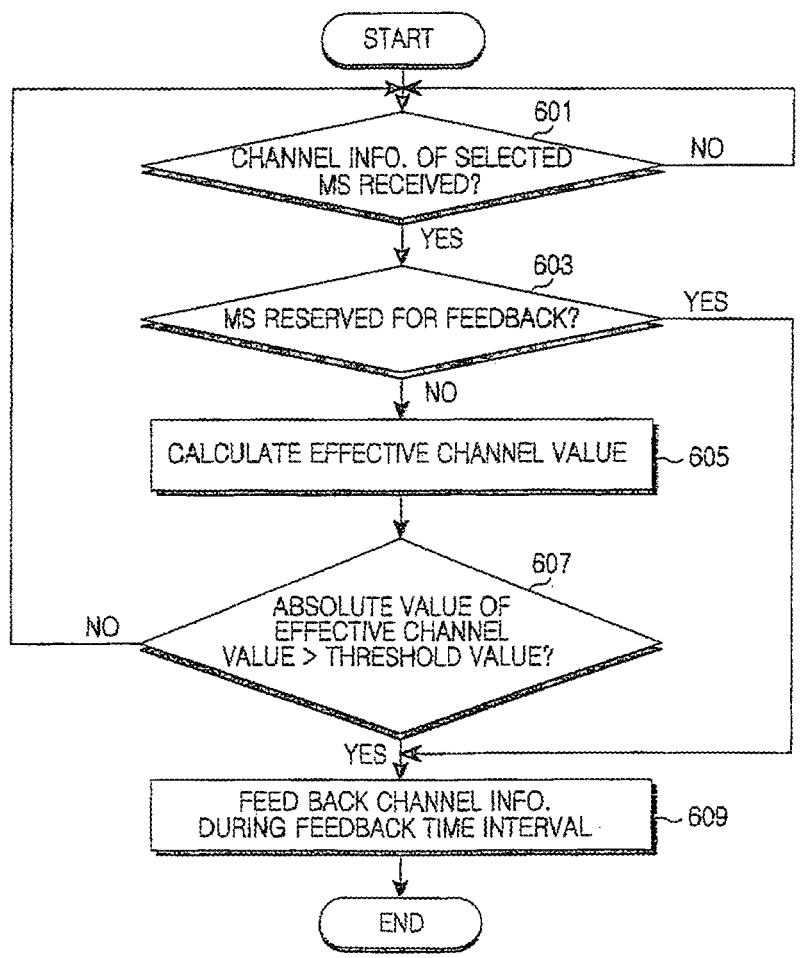
FIG. 6 is a flow diagram illustrating a channel information feedback process of an MS in a multi antenna wireless communication system according to a second exemplary embodiment of the present invention.

FIG. 6 is a flow diagram illustrating a channel information feedback process of an MS in a multi antenna wireless communication system according to a second exemplary embodiment of the present invention.

Referring to FIG. 6, the MS identifies whether it receives channel information, which is broadcasted by a BS, of a selected MS in step 601.

If the channel information of the selected MS is received, the MS identifies whether itself is reserved to feedback channel information in step 603. If the feedback is reserved, the MS transmits channel information during a feedback time interval with a frame in step 609.

If the feedback is not reserved otherwise, the MS calculates an effective channel value using the channel information of the selected MS in step 605. The effective channel value is calculated as in Equation 10 above.

After the effective channel value is calculated, the MS compares an absolute value of the effective channel value with a predetermined threshold value in step 607. If the absolute value of the effective channel value is smaller or equal to the predetermined threshold value, the MS does not feed back channel information during a follow-up feedback time interval and returns to the step 601, identifying whether it receives channel information of a newly selected MS during a subsequent channel information broadcasting time interval.

If the absolute of the effective channel value is larger than the predetermined threshold value, the MS transmits channel information to a BS during a feedback time interval within a frame in step 609.

Figure 7:
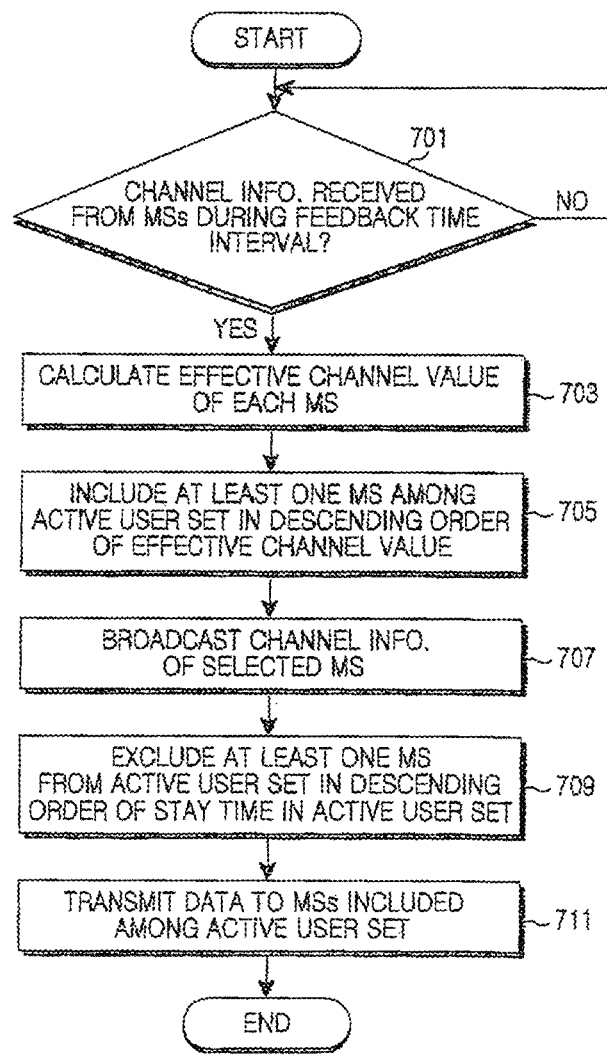
FIG. 7 is a flow diagram illustrating a downlink data transmission process of a BS in a multi antenna wireless communication system according to a second exemplary embodiment of the present invention.

FIG. 7 is a flow diagram illustrating a downlink data transmission process of a BS in a multi antenna wireless communication system according to a second exemplary embodiment of the present invention. FIG. 7 shows an operation process, during one frame time interval, of a BS performing scheduling in compliance with the scheme of FIG. 1B.

Referring to FIG. 7, the BS identifies whether it receives channel information from mobile stations during a feedback time interval within a frame in step 701.

If the channel information is received from the mobile stations during the feedback time interval, the BS creates an effective channel value of each MS having fed back the channel information in step 703. The effective channel value is calculated as in Equation 10 above.

After the effective channel value of each MS is calculated, the BS selects and includes at least one MS among an active user set in descending order of effective channel value. In other words, the BS identifies at least one MS having a large effective channel value and includes the identified at least one MS among the active user set. Number of the selected mobile stations is different depending on a concrete exemplary embodiment.

After the selected at least one MS is included among the active user set, the BS broadcasts channel information of the selected MS in step 707. That is, in order for mobile stations to judge whether they transmit channel information during a subsequent feedback time interval, the BS broadcasts the channel information of the selected MS.

Then, the BS excludes at least one of mobile stations, which are included among the active user set, from the active user set in descending order of stay time in the active user set in step 709. In other words, the BS identifies at least one MS having passed a long time since the MS is included among the active user set and excludes the identified at least one MS from the active user set. Number of the excluded mobile stations should be equal to the number of the mobile stations selected in the step 705.

Then, the BS transmits data to mobile stations included among the active user set during a data transmission time interval within a frame in step 711.

Figure 8A:
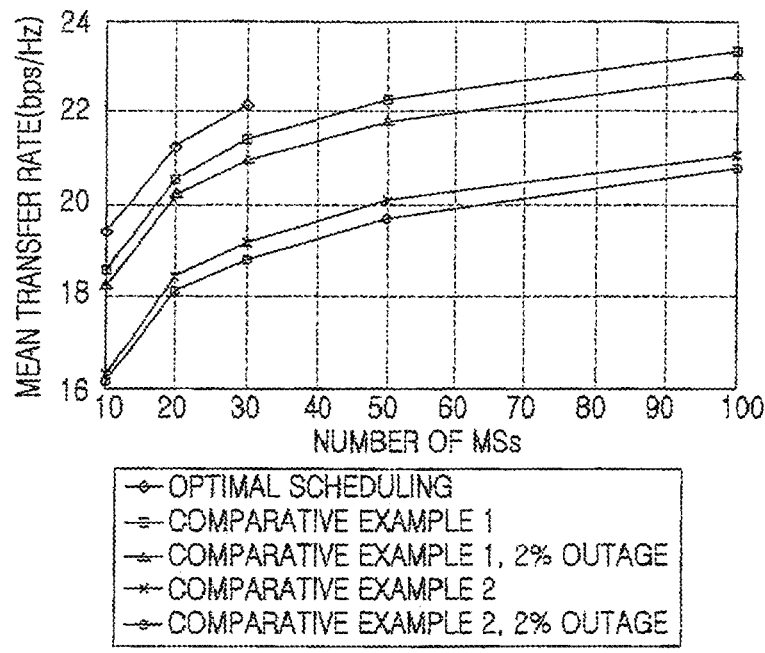
FIGS. 8A to 8C are graphs illustrating system performance when a scheduling technique of the present invention is applied.
Figure 8B:
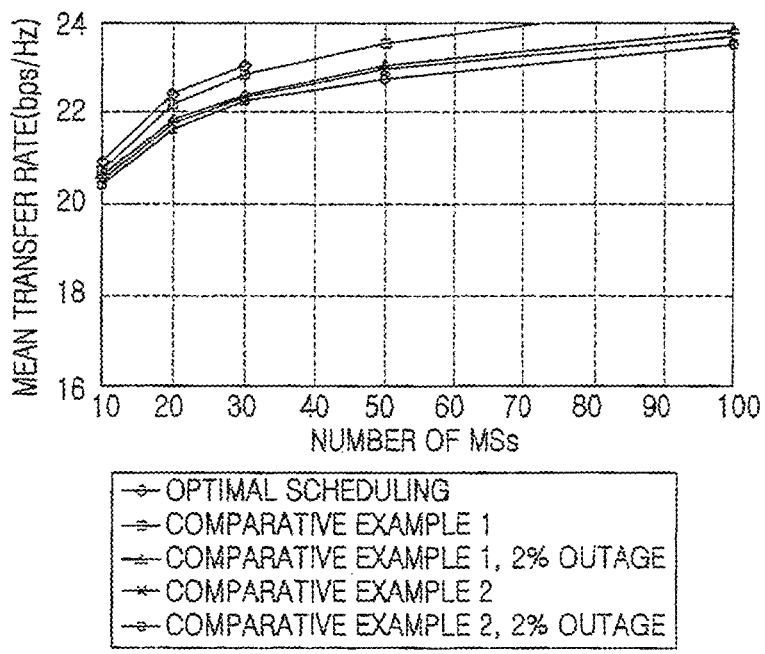
Figure 8C:
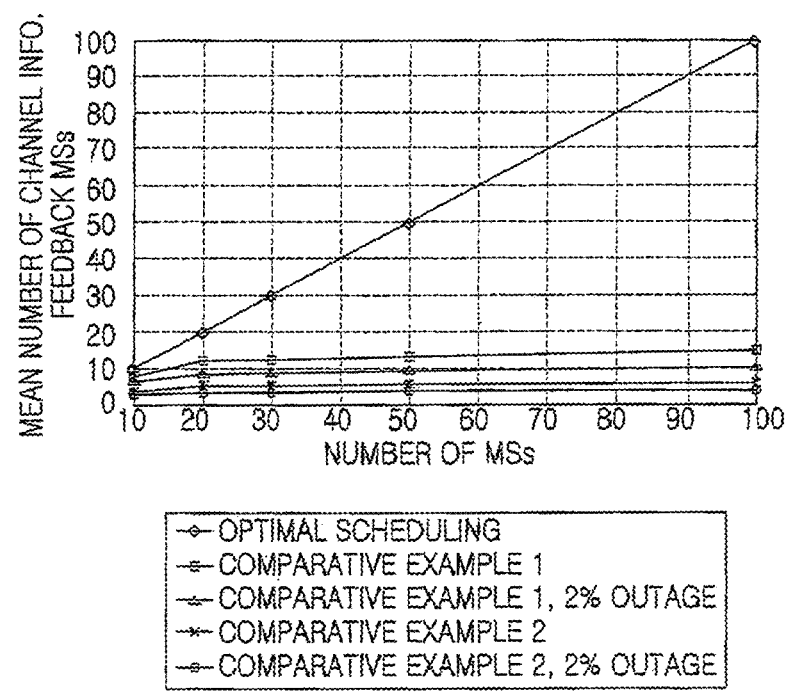

FIGS. 8A to 8C are graphs illustrating system performance when a scheduling technique of the present invention is applied. FIGS. 8A and 8B each show simulation experiment results of mean transfer rates measured when ZF and ZF-DPC technologies are applied. FIG. 8C shows a simulation experiment result of measured number of mean channel information feedback mobile stations depending on number of users. In order to set a reference value for channel information feedback determination in a simulation experiment, an outage case was defined as in Equation 12 below:

$$\text{Card}\{k||\eta|^2 > \eta_{th,n} \forall k \in \{1,2,\ldots,K\}\} < N \qquad (12),$$

where Card{X} is the number of elements of any set X, k is the index of MS, $\eta_k$ is the effective channel value of MS k, $\eta_{th,n}$ is the feedback determination threshold value during n-th feedback time interval, and N is the maximum number of mobile stations enabling feedback during one feedback time interval.

In the simulation experiment, a time-varying channel was defined as in Equation 13 below:

$$h_k(t+1) = \sqrt{1-\alpha} h_k(t) + \sqrt{\alpha} h_w \qquad (13),$$

where $h_k(t)$ is the channel value of MS k at time t, $\alpha$ is the channel variance weight value, and $h_w$ is the random variable for channel variance.

The $h_w$ follows independent and identically distributed (i.i.d.) complex Gaussian distribution having mean 0 and dispersion 1. In the simulation experiment, the '$\alpha$' of Equation 13 was set to 1, a Signal to Noise Ratio (SNR) to 16 dB, number of BS transmit antennas to 4 and the 'N' and the 'K' of Equation 12 each were set to 1 and 30.

Curves showing the highest mean transfer rates in FIGS. 8A and 8B are based on an optimal scheduling technique. The optimal scheduling technique is a scheme of receiving channel information from all mobile stations, full searching a transfer rate of every possible active user combination and selectively determining an active user set having the maximum transfer rate. The optimal scheduling technique is a criterion for comparing performance of the present invention.

In FIG. 8A, a scheduling technique of a comparative example 1 of the present invention shows performance of 97% of an optimal scheduling technique when a ZF technology is applied. Also, a scheduling technique of a comparative example 2 of the present invention shows performance of 87% of the optimal scheduling technique when the ZF technology is applied.

In FIG. 8B, a scheduling technique of a comparative example 1 of the present invention shows performance of 99.5% of an optimal scheduling technique when a ZF-DPC technology is applied. Also, a scheduling technique of a comparative example 2 of the present invention shows performance of 97% of the optimal scheduling technique when the ZF-DPC technology is applied.

In FIG. 8C, in the case of an optimal scheduling technique, number of the total mobile stations is equal to number of feedback mobile stations because all mobile stations feed back channel information. However, in the case of a scheduling technique of the present invention, only relatively constant number of mobile stations feed back channel information irrespective of number of the total mobile stations. That is, an amount of feedback data that a BS must receive is reduced.

As described above, the present invention can feed back, by opportunism, information for scheduling in a multi antenna wireless communication system, whereby the system can maintain a high reception success rate and at the same time, reduce an amount of feedback data.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus of a mobile station in a wireless communication system, the apparatus comprising:
a receiver configured to receive, from a base station to the mobile station, channel information for of at least one other mobile station;
a controller configured to determine whether to transmit channel information for the mobile station responsive to comparison of an effective channel value, determined based on a channel matrix of the mobile station and the channel information for the at least one other mobile station, to a threshold;
and a transmitter configured to transmit the channel information, from the mobile station to the base station, for the mobile station if the effective channel value is greater than the threshold, wherein the channel information for the at least one other mobile station is selected by the base station as an active user,
and wherein the effective channel value comprises a multiplication of a first matrix including the channel matrix of the mobile station and a second matrix including a matrix that is orthogonal with another channel matrix of the at least one other mobile station.

2. The mobile station of claim 1, wherein the transmitter is further configured to transmit the channel information for the mobile station irrespective of the effective channel value if channel information feedback is reserved by control of the base station.

3. The mobile station of claim 1, wherein the transmitter is further configured to transmit the channel information during a predetermined time interval within a frame.

4. The apparatus of claim 1, wherein the active user is an element of an active user set and the active user set is a set of mobile stations performing downlink communication during a pre-defined transmission time duration.

5. The mobile station of claim 1, wherein the controller is further configured to calculate the effective channel value and decide to feed back the channel information for the mobile station when an absolute value of the effective channel value is larger than the threshold.

6. The mobile station of claim 5, wherein the controller is further configured to calculate the effective channel value using an equation of:

$$\eta_k = h_k \cdot P_\perp(H(S)),$$

where $\eta_k$ is the effective channel value of mobile station k, $h_k$ is a channel matrix of mobile station k, $P_\perp(\cdot)$ is a function calculating projection matrix, and $H(S)$ is the channel value of the selected other mobile station.

7. The mobile station of claim 6, wherein the projection matrix is calculated using an equation of:

$$P_\perp(H) = I_{N_t} - H^H(HH^H)^{-1}H,$$

where $P_\perp(H)$ is a projection matrix that is orthogonal with matrix H, $I_{N_t}$ is a unit matrix of $N_t$ size, and H is a channel matrix.

8. An apparatus of a base station in of a wireless communication system, the apparatus comprising:
a receiver configured to receive channel information from one or more mobile stations including a mobile station;
a scheduler configured to determine not to transmit, from the base station to the one or more mobile stations, channel information for the mobile station if an effective channel value of the mobile station is less than n-th largest effective channel value among effective channel values of the one or more mobile stations;
and a transmitter configured to broadcast, from the base station to the one or more mobile stations, the channel information, received from the mobile station, of the mobile station, responsive to the effective channel value of the mobile station being greater than the n-th largest effective channel value among effective channel values of the one or more mobile stations,
wherein the scheduler is configured to select at least one mobile station in descending order of effective channel value and include the selected at least one mobile station in an active user set,
and wherein the effective channel value comprises a multiplication of a first matrix including a channel matrix of the mobile station and a second matrix including a matrix that is orthogonal with another channel matrix of at least one other mobile station.

9. The base station of claim 8, wherein the scheduler is further configured to schedule for downlink communication, after once performing an operation of selecting the at least one mobile station and updating the active user set.

10. The base station of claim 8, further comprising:
a generator configured to generate a control message controlling at least one mobile station within a cell to compulsorily feed back channel information, and
wherein the transmitter is further configured to transmit the control message to the at least one mobile station.

11. The base station of claim 9, wherein the scheduler is further configured to exclude at least one mobile station in descending order of stay time in the active user set, after selecting the at least one mobile station.

12. The base station of claim 9, wherein the transmitter is further configured to transmit data to mobile stations included among the active user set, after once broadcasting the channel information for the selected at least one mobile station.

13. The base station of claim 8, wherein the scheduler is further configured to re-select at least one mobile station having been previously selected when the channel information is not received from the mobile station during a predetermined time interval within a frame.

14. The base station of claim 13, wherein the scheduler is further configured to arbitrarily select at least one mobile station when the re-selection is not possible.

15. The base station of claim 8, further comprising:
a calculator configured to calculate the effective channel value of each of the one or more mobile stations having fed back the channel information, and
wherein the active user set is a set of mobile stations performing downlink communication during a pre-defined transmission time duration.

16. The base station of claim 15, wherein the calculator is further configured to calculate the effective channel value using an equation of:

$$\eta_k = h_k \cdot P_\perp(H(S)),$$

where $\eta_k$ is the effective channel value of mobile station k, $h_k$ is a channel matrix of mobile station k, $P_\perp(\cdot)$ is a function calculating projection matrix, and H(S) is the channel value of the selected other mobile station.

17. The base station of claim 16, wherein the projection matrix is calculated using an equation of:

$$P_\perp(H) = I_{N_t} - H^H(HH^H)^{-1}H,$$

where $P_\perp(H)$ is a projection matrix that is orthogonal with matrix H, $I_{N_t}$ is a unit matrix of $N_t$ size, and H is a channel matrix.

18. The base station of claim 8, wherein the scheduler is further configured to schedule for downlink communication, after at least twice repeatedly performing an operation of selecting at least one mobile station during a predetermined time interval within a frame and reconstructing the active user set.

19. The base station of claim 18, wherein the scheduler is further configured to initialize the active user set as a null set at a frame start time and repeatedly perform an operation of selecting the at least one mobile station until the active user set is saturated.

20. The base station of claim 18, wherein the transmitter is further configured to transmit data to mobile stations included among the active user set, after at least twice broadcasting the channel information for the selected at least one mobile station during the predetermined time interval within the frame.

21. A method of a mobile station in a multi antenna wireless communication system, the method comprising:
receiving, from the base station to the one or more mobile stations, channel information for at least one other mobile station that is selected as an active user from a base station;
determining whether to transmit channel information for the mobile station responsive to comparison of an effective channel value, determined based on a channel matrix of the mobile station and the channel information for the at least one other mobile station, to a threshold;
and transmitting, from the mobile station to the base station, the channel information for the mobile station if the effective channel value is greater than the threshold, wherein the channel information for the at least one other mobile station is selected by the base station as an active user,
and wherein the effective channel value comprises a multiplication product of a first matrix including the channel matrix of the mobile station and a second matrix including a matrix that is orthogonal with another channel matrix of the at least one other mobile station.

22. The method of claim 21, wherein deciding whether to feed back the channel information for the mobile station comprises:
deciding to feed back the channel information for the mobile station irrespective of the effective channel value when channel information feedback is reserved by control of the base station.

23. The method of claim 21, wherein the channel information is transmitted during a predetermined time interval within a frame.

24. The method of claim 21, wherein the active user is an element of an active user set and the active user set is a set of mobile stations performing downlink communication during a pre-defined transmission time duration.

25. The method of claim 21, wherein deciding whether to feed back the channel information for the mobile station comprises:
calculating an effective channel value; and
deciding to feed back the channel information for the mobile station when an absolute value of the effective channel value is larger than the threshold.

26. The method of claim 25, wherein the effective channel value is calculated using an equation of:

$$\eta_k = h_k \cdot P_\perp(H(S)),$$

where $\eta_k$ is the effective channel value of mobile station k, $h_k$ is a channel matrix of mobile station k, $P_\perp(\cdot)$ is a function calculating projection matrix, and H(S) is the channel value of the selected other mobile station.

27. The method of claim 26, wherein the projection matrix is calculated using an equation of:

$$P_\perp(H) = I_{N_t} - H^H(HH^H)^{-1}H,$$

where $P_\perp(H)$ is a projection matrix that is orthogonal with matrix H, $I_{N_t}$ is a unit matrix of $N_t$ size, and H is a channel matrix.

28. A method of a base station in a multi antenna wireless communication system, the method comprising:
receiving channel information from one or more mobile stations including a mobile station;
determining not to transmit, from the base station to the one or more mobile stations, channel information for the mobile station if an effective channel value of the mobile station is less than an n-th largest effective channel value among effective channel values of the one or more mobile stations; broadcasting, from the base station to the one or more mobile stations, the channel information, received from the mobile station, of the mobile station, responsive to the effective channel value of the mobile station being greater than the n-th largest effective channel value among effective channel values of the one or more mobile stations, selecting at least one mobile station in descending order of effective channel value;
and including the selected at least one mobile station in an active user set, and wherein the effective channel value comprises a multiplication of a first matrix including a channel matrix of the mobile station and a second matrix including a matrix that is orthogonal with another channel matrix of at least one other mobile station.

29. The method of claim 28, further comprising:
transmitting a control message controlling some of mobile stations within a cell to compulsorily feed back channel information.

30. The method of claim 28, further comprising calculating an effective channel value of each of the one or more mobile stations having fed back the channel information, wherein the active user set is a set of mobile stations performing downlink communication during a pre-defined transmission time duration.

31. The method of claim 30, wherein the effective channel value is calculated using an equation of:

$$\eta_k = h_k \cdot P_\perp(H(S)),$$

where $\eta_k$ is the effective channel value of mobile station k, $h_k$ is a channel matrix of mobile station k, $P_\perp(\cdot)$ is a function calculating projection matrix, and $H(S)$ is the channel value of the selected other mobile station.

32. The method of claim 31, wherein the projection matrix is calculated using an equation of:

$$P_\perp(H) = I_{N_t} - H_H(HH_H)^{-1}H,$$

where $P_\perp(H)$ is a projection matrix that is orthogonal with matrix H, $I_{N_t}$ is a unit matrix of $N_t$ size, and H is a channel matrix.

33. The method of claim 28, further comprising:
at least twice repeatedly performing an operation of selecting at least one mobile station during a predetermined time interval within a frame and an operation of broadcasting channel information for the least one mobile station, and reconstructing the active user set; and
performing downlink communication with mobile stations included among the active user set.

34. The method of claim 33, wherein reconstructing the active user set comprises:
initializing the active user set as a null set at a frame start time; and
repeatedly performing an operation of selecting the at least one mobile station until the active user set is saturated.

35. The method of claim 28, further comprising:
once performing an operation of selecting the at least one mobile station and an operation of broadcasting channel information for the at least one mobile station, and updating the active user set; and
performing downlink communication with mobile stations included among the active user set.

36. The method of claim 35, further comprising:
updating the active user set;
including the at least one mobile station among the active user set; and
excluding at least one mobile station from the active user set in descending order of stay time in the active user set.

37. The method of claim 28, further comprising:
re-selecting at least one mobile station having been previously selected when the channel information is not received from the mobile station during a predetermined time interval within a frame.

38. The method of claim 37, further comprising:
arbitrarily selecting at least one mobile station when the re-selection is not possible.

* * * * *